United States Patent
Ueno et al.

(10) Patent No.: US 6,511,765 B2
(45) Date of Patent: Jan. 28, 2003

(54) FUEL CELL SYSTEM

(75) Inventors: Masataka Ueno, Hokkaido (JP); Kenji Kato, Hokkaido (JP); Munehisa Horiguchi, Hokkaido (JP); Noriyuki Takada, Hokkaido (JP)

(73) Assignee: Kabusikikaisha Equos Research (JP)

( * ) Notice: Subject to any disclaimer, the term of this patent is extended or adjusted under 35 U.S.C. 154(b) by 110 days.

(21) Appl. No.: 09/725,882

(22) Filed: Nov. 30, 2000

(65) Prior Publication Data

US 2001/0001287 A1 May 17, 2001

Related U.S. Application Data

(62) Division of application No. 09/215,321, filed on Dec. 18, 1998, now Pat. No. 6,294,277.

(30) Foreign Application Priority Data

Dec. 22, 1997 (JP) .............................................. 9-365850
Mar. 2, 1998 (JP) ........................................... 10-067885
Aug. 10, 1998 (JP) ........................................... 10-226100

(51) Int. Cl.[7] .............................................. H01M 8/04
(52) U.S. Cl. .............................. 429/22; 429/24; 429/26
(58) Field of Search .............................. 429/24, 22, 26, 429/20, 19, 25, 17

(56) References Cited

U.S. PATENT DOCUMENTS

| | | |
|---|---|---|
| 4,000,003 A | 12/1976 | Baker et al. |
| 4,324,844 A | 4/1982 | Kothmann ................... 429/26 |

(List continued on next page.)

FOREIGN PATENT DOCUMENTS

| | | |
|---|---|---|
| EP | 301757 | 2/1989 |
| EP | 817298 | 2/1989 |
| EP | A07-220746 | 8/1995 |
| JP | 59-117074 | 7/1984 |
| JP | 60136178 | 7/1985 |
| JP | 6-338338 | 12/1994 |
| JP | 7-14599 | 1/1995 |
| JP | A07-263010 | 10/1995 |
| JP | 8-96818 | 4/1996 |
| JP | A05-054900 | 3/1997 |
| JP | 9-266004 | 10/1997 |
| JP | 10106600 | 4/1998 |
| JP | 10-172593 | 6/1998 |
| JP | 10-247505 | 9/1998 |
| JP | 10-255828 | 9/1998 |
| JP | A11-135133 | 5/1999 |
| JP | A11-162490 | 6/1999 |
| JP | A11-191423 | 7/1999 |
| WO | 95/25357 | 9/1995 |
| WO | 98/45889 | 10/1998 |
| WO | 99/05740 | 2/1999 |

OTHER PUBLICATIONS

Nguyen, T.V. et al: "A Water and Heat Management Model for Proton–Exchange–Membrane Fuel Cells" Journal of Electrochemical Society, vol. 140, No. 8, Aug. 1, 1993.

*Primary Examiner*—Stephen Kalafut
*Assistant Examiner*—R. Alejandro
(74) *Attorney, Agent, or Firm*—Lorusso & Loud (57) ABSTRACT

A fuel cell power generating apparatus includes a stack of a plurality of fuel cell units each having a cathode and an anode disposed on opposite sides of an electrolyte membrane. A fuel gas supply system supplies fuel gas to the anode, an air supply system supplies air to the cathode and a water supply system supplies liquid water to the cathode. A control unit ensures that, when the apparatus starts up, the cathode is first supplied with air, followed by supply of the liquid water. In a preferred embodiment, the water supply system intermittently sprays the liquid water onto the cathode when the temperature of the fuel cell stack monitored by a temperature sensor falls below a predetermined temperature.

4 Claims, 7 Drawing Sheets

U.S. PATENT DOCUMENTS

| | | | |
|---|---|---|---|
| 4,585,708 A | 4/1986 | Abens et al. | 429/17 |
| 4,826,741 A | 5/1989 | Adlhart et al. | 429/19 |
| 5,085,949 A | 2/1992 | Sanderson et al. | 429/23 |
| 5,139,894 A | 8/1992 | Mizuno et al. | 429/9 |
| 5,316,870 A | 5/1994 | Ohga | 429/24 |
| 5,360,461 A | 11/1994 | Meinzer | 432/658.2 X |
| 5,432,020 A | 7/1995 | Fleck et al. | 429/19 X |
| 5,434,016 A | 7/1995 | Benz et al. | 429/19 X |
| 5,441,819 A | 8/1995 | Voss et al. | 429/13 |
| 5,645,950 A | 7/1997 | Benz et al. | 429/13 |
| 5,766,786 A | 6/1998 | Fleck et al. | 429/17 |
| 5,853,910 A * | 12/1998 | Tomioka et al. | 429/17 |
| 5,958,613 A | 9/1999 | Hamada et al. | 429/26 |
| 6,013,385 A | 1/2000 | DuBose | 429/17 |

* cited by examiner

FUEL CELL SYSTEM

This application is a division of U.S. application Ser. No. 09/215,321 filed Dec. 18, 1998, now U.S. Pat. No. 6,294,277.

Field of the Invention

The present invention relates to a fuel cell system and more particularly to a fuel cell system using a proton exchange membrane as an electrolyte.

DESCRIPTION OF THE PRIOR ART

A proton exchange membrane fuel cell comprises a proton exchange membrane (PEM) between two electrodes that is a cathode to which an oxidizing gas is supplied and an anode to which fuel gas is supplied. PEM acts as an electrolyte and transports therethrough hydrogen ions obtained at the anode of the fuel cell toward the cathode in the form of proton ($H^+$). Each of the electrodes comprises a catalyst layer deposited on a porous base member through which the reactant gas is supplied. Mounted externally of each electrode is a separator or connector plate with grooves permitting the reactant gas to be introduced into the electrode at a constant flow rate. Excess gas which has not been consumed by the fuel cell reaction is exhausted to the open air through the grooved separator. The electricity generated by the energy conversion reaction at the anode is collected at the electrode porous base member and transported to the outside of the fuel cell system through the separator. In actual application, the system includes a plurality of fuel cells which are stacked in series with the separator being interposed between adjacent fuel cells.

Since the fuel cell generates heat in correspondence to the electric power generated, a fuel cell stack usually includes cooling plates between fuel cells at predetermined intervals. Each cooling plate has a passage of a cooling medium such as air and water to prevent overheating of fuel cells in operation.

Protons are hydrated in transfer through the PEM electrolyte, so that the PEM tends to become dehydrated as the fuel cell reaction proceeds. The PEM must always be properly humidified to prevent decrease of ion-conductivity and energy conversion efficiency. In the conventional designs, hydrogen gas is humidified by suitable means which, in turn, humidify the PEM when it is supplied to the anode.

Various attempts have also been proposed to humidify the air supplied to the cathode. Since the cathode of the fuel cell operates at 80° C., for example, the air of a normal temperature should be preheated by a humidifier so that its saturated vapor becomes consistent with the ambient vapor condition of the cathode. Such a humidifier that is required to have both a water supplying function and an air preheating function can not be simple in construction.

In Japanese patent un-examined publication No. 7-14599, there is provided a water injection nozzle to inject a necessary quantity of water into an air introducing pipe through which air is supplied to the cathode of the PEM fuel cell. Since the nozzle is located upstream of a compressor, liquid water injected from the nozzle is evaporated by the heat generated by the compressor. Thus, the cathode is humidified by vapor, not by liquid water.

In the fuel cell system of Japanese patent un-examined publication No. 9-266004, a discharge gas from the anode containing hydrogen gas which has not been consumed during the anodic reaction is introduced into the cathode where the unconsumed hydrogen gas in the discharge gas is combusted with oxygen to generate water, which well humidifies the PEM electrolyte. In this system, there is no need to install a humidifier for humidifying the air supplied to the cathode.

During operation of the fuel cell system, electrons produced at the anode move to the cathode where they react with oxygen in the air or any other oxidizing gas supplied thereto to produce water. Accordingly, in accordance with the conventional practice in the art, there is a greater need to humidify hydrogen gas to be supplied to the anode, than at the cathode where supply of water is at least partially self-sustaining.

As a result of the inventors' repeated tests and investigation, however, it has been found that water produced at the cathode permeates through the PEM electrolyte toward the anode, which makes it unnecessary to humidify hydrogen gas to be supplied to the anode. On the other hand, the quantity of water in the PEM electrolyte at the cathode tends to be decreased by the air flow to the cathode. Such finding is contradictory to the conventional understanding and has been first recognized by the present inventors.

SUMMARY OF THE INVENTION

It is an object of the present invention to provide a fuel cell system, based on the above-described finding, which is capable of maintaining a proton exchange membrane in a suitably moist condition.

Another object of the present invention is to provide a fuel cell system which is simple in construction, small in size, easy to install and, therefore, particularly suitable to be mounted on a vehicle.

Still another object of the present invention is to smoothly and effectively humidify an electrolyte membrane in a fuel cell system during the start-up operation of the system.

Accordingly, the present invention provides a fuel cell system in which water is supplied to the surface of the cathode, not in a vapor state, but in a liquid state. Thus, the fuel cell system of the present invention comprises one or more fuel cells each having an anode, a cathode and an electrolyte membrane interposed between the anode and the cathode; first gas supplying means for supplying a first gas including fuel gas to the anode; second gas supplying means for supplying a second gas including oxygen to the cathode; liquid water supplying means for supplying liquid water to the surface of the cathode; and control means for controlling operation of the second gas supplying means and the liquid water supplying means such that, when the system starts up, the cathode first receives supply of the second gas, followed by supply of the liquid water. Liquid water supplied onto the surface of the cathode may preferentially take latent heat from the air around the cathode to prevent water evaporation from the electrolyte membrane which, therefore, remains in a suitably and evenly moist condition. This contributes to improvement of capacity and durability of the fuel cell system. Supply of the liquid water is also effective to cool the cathode which would otherwise become overheated to an excessive temperature, which means that the temperature of the fuel cell of the present invention may be controlled without need to use cooling plates.

In accordance with the above aspect of the present invention, the liquid water supplying means may supply the liquid water continuously during start-up operation of the system. In a modified application, the liquid water supplying means supplies the liquid water for a predetermined period during start-up operation of the system. Accordingly, the electrolyte membrane, which could have become too dry to provide its original performance after a long time interval from the last operation of the fuel cell system, is readily humidified. The liquid water supplied by the liquid water supplying means is well dispersed onto the surface of the cathode by the flow of the first gas such as the air supplied by the second gas supplying means.

In accordance with another aspect of the present invention, there is provided a fuel cell system comprising one or more of fuel cells each having an anode, a cathode and an electrolyte membrane interposed between the anode and the cathode; first gas supplying means for supplying a first gas including fuel gas to the anode; second gas supplying means for supplying a second gas including oxygen to the cathode; liquid water supplying means for supplying liquid water onto the surface of the cathode; sensor means for detecting water supply capacity of the liquid water supplying means at least when the system starts up; and control means for discontinuing or interrupting operation of the system when the sensor means detects that water supply capacity of the liquid water supplying means has decreased to below a predetermined minimum level. In a preferred embodiment, the liquid water supplying means includes a water tank, the sensor means comprises a water level sensor that detects a water level in the water tank, and the control means discontinues or interrupts the system operation when the water level in the water tank detected by the water level sensor is decreased to below a predetermined minimum water level. In another preferred embodiment, when the water supply capacity of the liquid water supplying means is found to be below a predetermined minimum level, the control means outputs a signal to alarm means that outputs some visual or audible alarm sign to urge an operator of the system to supplement liquid water to the liquid water supplying means.

In accordance with still another aspect of the present invention, there is provided a fuel cell system comprising one or more fuel cells each having an anode, a cathode and an electrolyte membrane interposed between the anode and the cathode; fuel gas supplying means for supplying a fuel gas to the anode; fuel gas discharge means for discharging the fuel gas from the anode; and control means for controlling the fuel gas supplying means and fuel gas discharge means such that, when the system starts up, the fuel gas discharge means is opened for a predetermined period and then closed. The gas supplying means starts continuous supply of the fuel gas after opening the fuel gas discharge means. When the fuel gas supplying means comprises a hydrogen storing alloy such as $LaNi_5$, $TiFe$, $ZrMn_2$, $Mg_2Ni$ which produces hydrogen gas when heated, the maximum internal pressure in the fuel gas supplying means may exceed the pressure-proof capacity of the fuel cell. For this reason, the fuel gas supply passage from the hydrogen storing alloy tank to the anode of the fuel cell includes a valve that is opened under control to reduce the hydrogen gas pressure. However, when the tank is first opened, irrespective of operation of the valve, an extraordinarily high pressure could be applied to the fuel cell, which could cause serious damage to the electrolyte membrane. This is prevented by the above aspect of the present invention in which, even if an extraordinarily high pressure is applied to the fuel cell at the time when the tank is first opened, it is smoothly discharged through the fuel gas discharge means to the open air.

In the above aspect of the present invention, it is preferable to provide liquid water supplying means for supplying liquid water to the surface of the cathode, which is controlled by the control means to start supply of the liquid water to the surface of the cathode before opening the fuel gas discharge means.

In accordance with still another aspect of the present invention, there is provided a fuel cell system including one or more fuel cells each having an anode, a cathode and an electrolyte membrane interposed between the anode and the cathode; first gas supplying means for supplying a first gas including fuel gas to the anode; second gas supplying means for supplying a second gas including oxygen to the cathode; liquid water supplying means for supplying liquid water to the surface of the cathode; sensor means for detecting a temperature of gas discharged from the fuel cells; and control means responsive to detection by the sensor means to control operation of the liquid water supplying means such that the liquid water is supplied to the surface of the cathode only when the sensor means detects that the discharge gas from the fuel cells has a temperature below a first predetermined temperature while the system is in operation. This minimizes energy consumption by the liquid water supplying means and improves energy efficiency in the overall fuel cell system. In a preferred embodiment, the liquid water supplying means operates to continuously supply liquid water to the surface of the cathode when the sensor means detects that the discharge gas from the fuel cells has a temperature above the first predetermined temperature but still below a second predetermined temperature. In a more preferred embodiment, the control means interrupts operation of the system when the sensor means detects that the discharge gas from the fuel cells has a temperature above the second predetermined temperature.

In accordance with still another aspect of the present invention, there is provided a fuel cell system comprising one or more of fuel cells each having an anode, a cathode and an electrolyte membrane interposed between the anode and the cathode, including a fuel gas passage extending through the anode; fuel gas supplying means for supplying a fuel gas to the fuel gas passage; interruption means for closing the fuel gas passage while it is filled with the fuel gas supplied by the fuel gas supplying means; and pressure loss sensor means for detecting a pressure loss in the fuel gas passage. This aspect of the present invention is based on finding that there is a tendency of fuel gas to leak through the electrolyte membrane as it deteriorates with time. Accordingly. when an excessive degree of pressure loss in the fuel gas passage is detected by the sensor means, it may be inferred that the electrolyte membrane has deteriorated to the extent that it should be replaced with a fresh one.

In the preferred operation, the output of the fuel cells is connected to an external load when the output voltage detected by an output voltage sensor means satisfies predetermined conditions. This prevents an excessive load from being applied to the fuel cells and, therefore, prevents deterioration of the fuel cells and damage to the electrolyte membrane. It is preferable that the predetermined conditions include not only the total output voltage of the fuel cell stack but also the output voltage of a single unit fuel cell or a couple or series of fuel cells. By way of example, the fuel cells are connected when the output voltage of a single unit fuel cell or a predetermined series of fuel cells reaches a first predetermined level (8V, for example) and the total output voltage of the fuel cell stack reaches a second predetermined level (38V, for example).

In accordance with still another aspect of the present invention, there is provided a fuel cell system comprising one or more fuel cells each having an anode, a cathode and an electrolyte membrane interposed between the anode and the cathode; fuel gas supplying means for supplying a fuel gas to the anode; fuel gas discharge means for discharging the fuel gas from the anode; and stop control means for interrupting output from the fuel cells, then closing the fuel gas supplying means and then closing the fuel gas discharge means. This minimizes the quantity of the fuel gas still remaining after the fuel cell operation is discontinued and prevents excessive post fuel cell reaction which would deteriorate the fuel cells. More preferably, supply of air and water to the cathode is interrupted after the fuel gas discharge means is closed, which suppresses heat generation by post fuel cell reaction.

In accordance with still another aspect of the present invention, there is provided a fuel cell system including one or more of fuel cells each having an anode, a cathode and an electrolyte membrane interposed between said anode and said cathode; first gas supplying means for supplying a first gas including a fuel gas to said anode; fuel gas discharge means for discharging said fuel gas from said anode; second gas supplying means for supplying a second gas including oxygen to said cathode; liquid water supplying means for supplying liquid water to the surface of said cathode; and control means for controlling operation of said system such that, when said system is to be stopped, said first gas supplying means, then said fuel gas discharge means and then said liquid water supplying means are stopped in this order.

BRIEF DESCRIPTION OF THE DRAWINGS

The foregoing and other objects and features of the present invention will become apparent from the following description when read in conjunction with the accompanying drawings in which.

DETAILED DESCRIPTION OF THE PREFERRED EMBODIMENT

Figure 1:
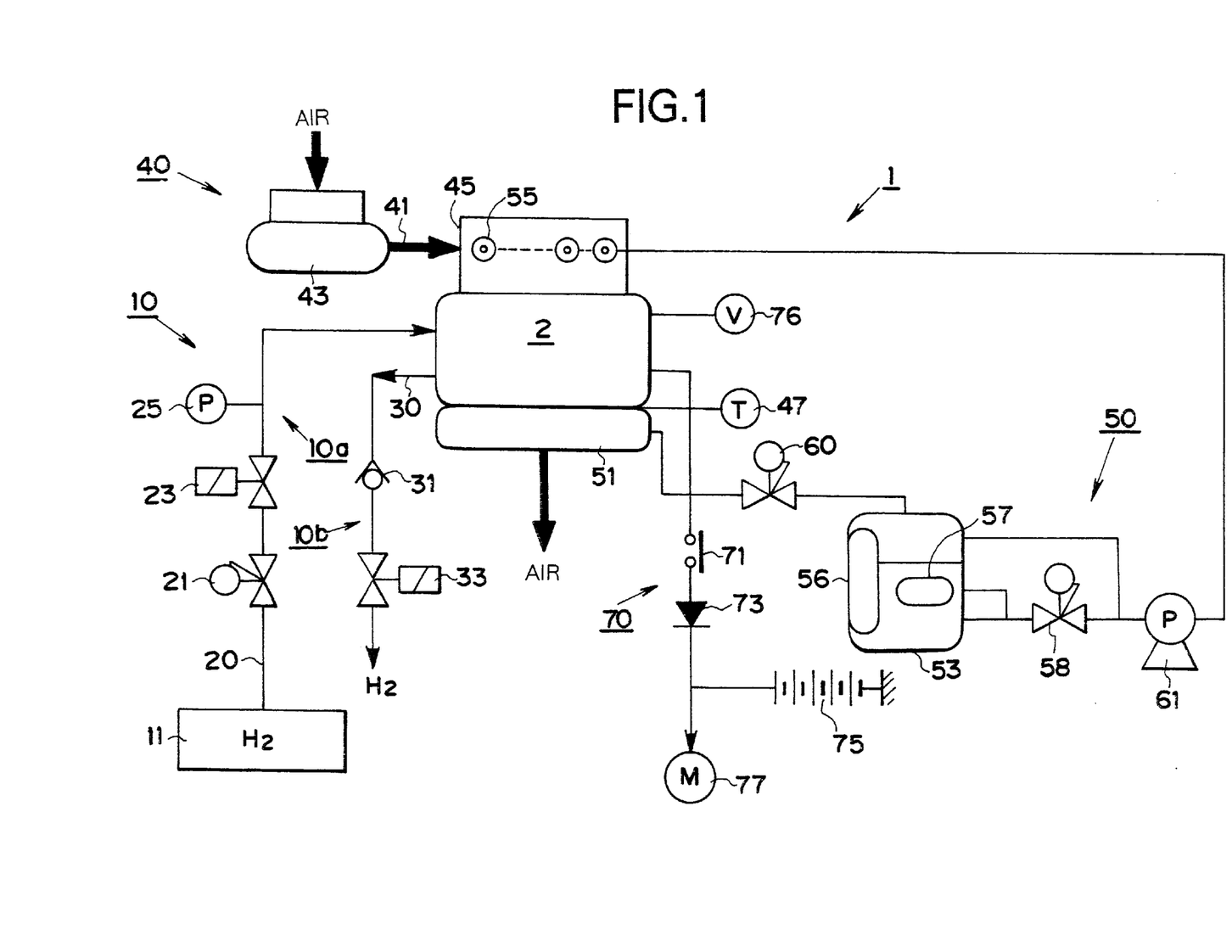
FIG. 1 is a schematic view diagrammatically showing the structure of a fuel cell power generating apparatus embodying the present invention.

FIG. 1 diagrammatically shows the structure of a fuel cell power generating apparatus 1 according to an embodiment of the present invention, which comprises, in general, a proton exchange electrolyte fuel cell stack 2, a fuel gas supply system 10, an air supply system 40 and an output system 70.

Figure 2:
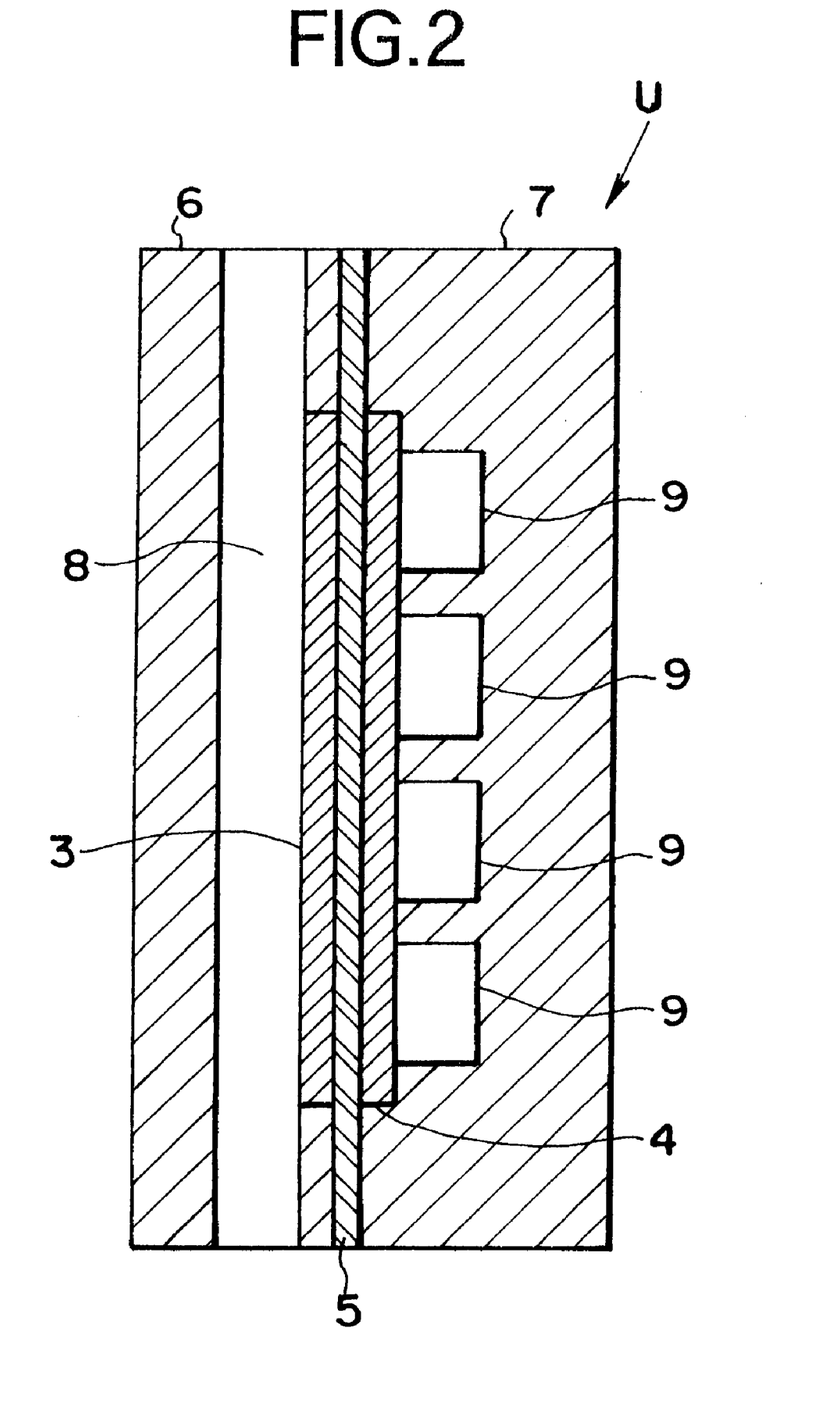
FIG. 2 is a schematic view showing the single fuel cell structure in the apparatus shown in FIG. 1.
Figure 3:
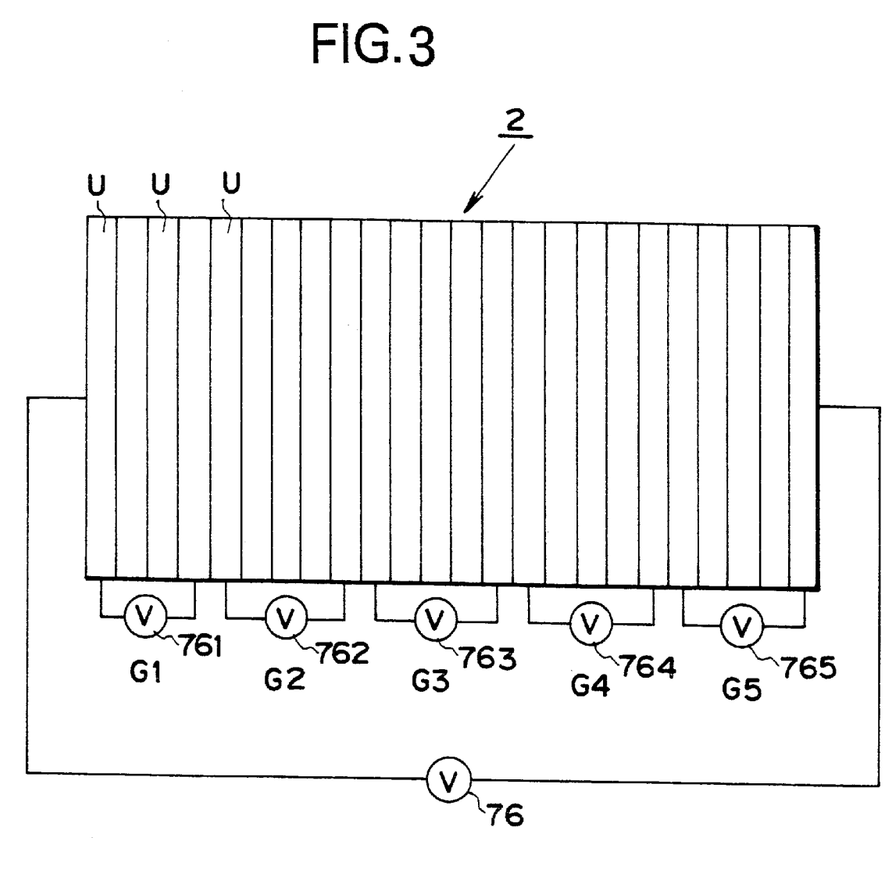
FIG. 3 is a schematic view showing the fuel cell stack including a plurality of single fuel cells each having the structure of FIG. 2.

Fuel cell stack 2 comprises a plurality of single fuel cell units U connected in series. Shown in FIG. 2 is a structure of single fuel cell unit U which, as known in the art, comprises an air electrode or cathode 3, a fuel electrode or anode 4, and an electrolyte membrane 5 interposed therebetween. Separators 6, 7 are provided at both sides of cathode 3 and anode 4, respectively, and separate adjacent fuel cell units. Although single fuel cell units U may have various and different structures, in the example of FIG. 2, separator 6 has a plurality of longitudinally extending air flow passages 8 that allow air to flow therethrough in contact with cathode 3, whereas separator 7 has a plurality of transversely extending hydrogen gas flow passages 9 that allow hydrogen gas to flow therethrough in contact with anode 4. In stack 2 of this example, several fuel cell units U are coupled in series as shown in FIG. 3 to constitute fuel cell groups G1–G5, the output volume of which is detected by voltmeters 761–765. The overall output voltage from stack 2 is detected by a voltmeter 76.

Fuel gas supply system 10 comprises a fuel gas induction system 10a and a fuel gas discharge system 10b. Fuel gas induction system 10 includes a hydrogen adsorptive alloy 11 and a hydrogen gas induction passage 20 through which hydrogen gas released from the hydrogen adsorptive alloy 11 is supplied to hydrogen gas flow passages 9 at anodes 4 of respective fuel cell units U in stack 2. Passage 20 has a pressure control valve 21 that is controlled to regulate and reduce the pressure of hydrogen gas from hydrogen adsorptive alloy 11, an electromagnetic valve 23 that is controlled to open and close passage 20, and a pressure sensor of well-known construction that detects the pressure of hydrogen gas supplied to anodes 4 in stack 2.

Hydrogen gas discharge system 10 includes a hydrogen gas discharge passage 30 with a check valve 31 and an electromagnetic valve 33. Check valve 31 permits one-way gas flow in passage 30 and prevents entry of atmospheric air to anodes 4 in stack 2. Hydrogen gas which has not been consumed and remains at anodes 4 in stack 2 is discharged through passage 30 to the open air. Electromagnetic valve 33 is intermittently driven to discharge water which is produced by reaction or combustion between hydrogen gas discharged through passage 30 from anodes 4 and air introduced from the atmosphere, which occurs in a catalytic combustor also mounted in passage 30, though not shown in FIG. 1.

Air supply system 40 introduces the atmospheric air to air flow passage 8 at cathodes 3 of respective fuel cell units U in stack 2, and then discharges air from stack 2 to the open air through condenser 51 where water is separated from the discharged air. System 40 includes an air supply passage 41, with a fan 43, through which the atmospheric air is supplied to an air intake manifold mounted above stack 2, and then flows through air flow passage 8. In this embodiment, one or more of nozzles 55 are mounted on one or both of side walls of air intake manifold 45 for spraying liquid water into the air flowing through manifold 45. Most of the sprayed water reaches condenser 51 still in the liquid state, but a portion thereof evaporates during flowing through stack 2, which portion is condensed by condenser 51 to collect liquid water. The discharge air from cathode 3 may include vapor generated by fuel cell reaction in stack 2, which is also treated by condenser 51 to collect liquid water. In this embodiment, condenser 51 has a conventional heat exchanger and a cooling fan (both not shown) but of course may be of any design. The temperature of discharge gas from stack 2, which should be equivalent to the stack temperature, is monitored by a temperature sensor 47.

Water supply system 50 is a closed system in which water in a tank 53 is supplied to air intake manifold 45 through nozzles 55 and return water from condenser 51 to tank 53. A water level in tank 53 is constantly monitored by a water level sensor 56 of a floating type, for example. To prevent freezing of water in tank 53, a heater 57 and an electromagnetic valve 58 are provided. Another electromagnetic valve 60 is mounted in a conduit connected between condenser 51 and tank 53 to prevent evaporation of water in tank 53.

Water in tank 53 is pumped up by a pump 61 and supplied to nozzles 55 which continuously or intermittently sprayed water onto the surface of cathodes 3 in stack 2. The sprayed water will preferentially take latent heat from cathode 3 and, therefore, prevent water evaporation or dehydration of electrolyte membrane 5 which remains in a properly moist condition. The sprayed water will also cool cathode 3 to automatically control the temperature of stack 2. No additional cooling medium is required.

Output system 70 receives the output from stack 2 to drive a motor 77. Output system 70 includes a switch relay 71, a battery 75 and a rectifying diode 73 between relay 71 and battery 75. Battery 75 is provided as an auxiliary power source which supplies power to motor 77 when stack 2 becomes inoperative during driving of a vehicle. When motor 77 is driven only by battery 75, this is made known to the driver through visual or audible information means such as a display (not shown). In a preferred embodiment, the display also indicates the remaining battery time.

Figure 4:
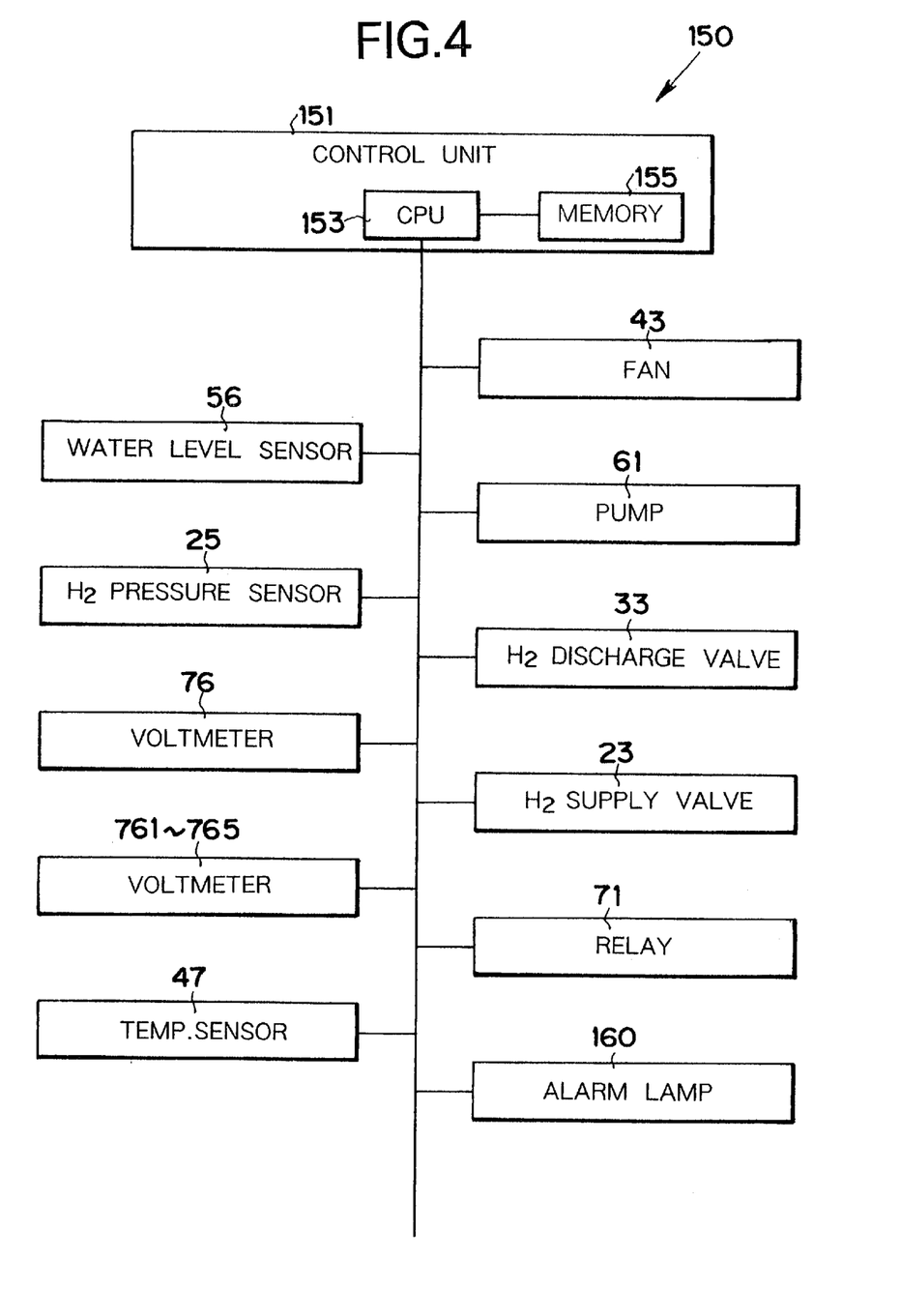
FIG. 4 is a block diagram showing a control system of the apparatus of FIG. 1.

FIG. 4 shows a control system 150 of apparatus 1 in which the respective constituents are assigned the same numbers as shown in FIG. 1. A control unit 151 has a CPU 153 and a memory 155. CPU 153 is connected to the respective constituents through interfaces (not shown) and control operation thereof in accordance with control programs in memory 155 to execute the following control operation.

Figure 5:
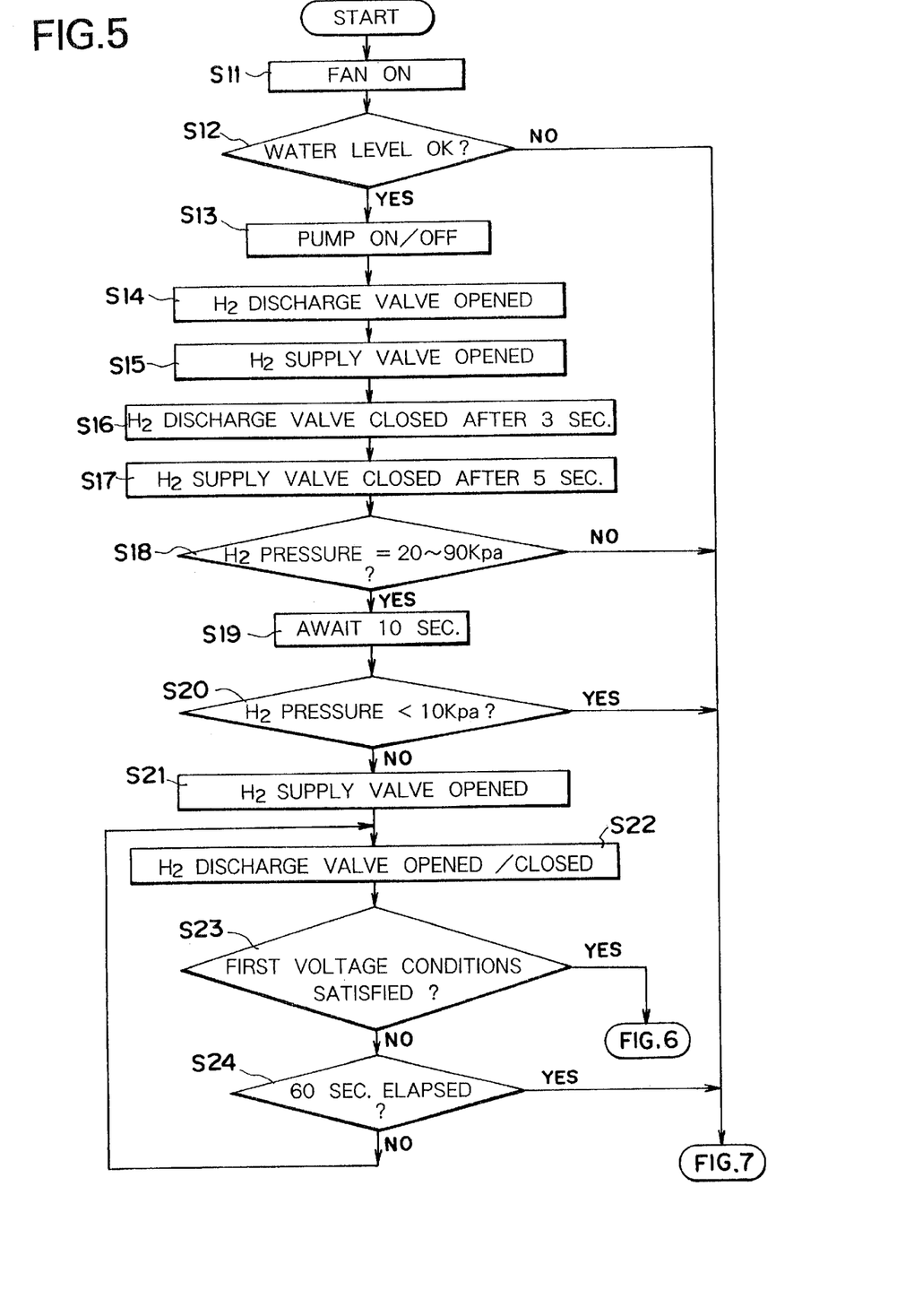
FIG. 5 is a flowchart showing the start-up control operation of the apparatus of FIG. 1.

Referring now specifically to the flowchart of FIG. 5 showing the start-up control operation of apparatus 1, when apparatus 1 is to be started up, at first, fan 43 is driven to begin supplying air to air intake manifold 45, at S11. Next, at S12, it is determined if the current water level in tank 53 monitored by sensor 56 is higher than a predetermined level, which may be 10% of the maximum capacity in tank 53. When the current water level is below the predetermined level, the start-up control operation is terminated and the stop control operation begins with the flowchart of FIG. 7 to be described later. Alarm lamp 160 is lit to urge water supplement into tank 53.

When tank 53 has a sufficient quantity of water, the procedure is advanced to S13 where pump 61 is driven for over 10 seconds to allow nozzles 55 to inject water into air intake manifold 45. As described before, the sprayed water keeps electrolyte membrane 5 in a properly moist condition. Accordingly, it is possible to prevent damage to electrolyte membrane 5 which might otherwise occur due to reaction or combustion when hydrogen gas is supplied to anode 4.

When apparatus 1 has been at standstill for a long period of time, some quantity of air in cathode 3 could permeate to anode 4 through electrolyte membrane and then flow into passage 9, which quantity of air should be replaced with hydrogen gas. A safeguard operation is carried out through S14–S17 so that hydrogen gas flow passages 9 in the respective anodes 4 of stack 2 are all filled with hydrogen gas. More particularly, hydrogen gas discharge valve 33 is opened at S14 and, immediately thereafter, electromagnetic valve 23 is opened at S15. Since valve 33 has already been opened when hydrogen gas is supplied through valve 23, a momentary gas pressure in hydrogen gas supply system 10 may be discharged to the open air to prevent damage to the electrolyte membrane 5. Valve 33 remains open for 3 seconds, during which time valve 23 is opened, and then closed at S16. Valve 23 remains open for 5 seconds and is then closed at S17. Through S14–S17, any air may be purged, not only from passages 9 in stack 2, but also from hydrogen gas induction system 10a.

Immediately after opening valve at S17, the pressure of hydrogen gas in induction system 10a is detected by sensor 25 at S18. When the pressure detected is not within a predetermined range, for example 20–90 Kpa ("No" at S18), the start-up control operation is terminated and the stop control operation begins with the routine of flowchart of FIG. 7 to be described later, and alarm lamp 160 is turned on to urge inspection and repair of hydrogen gas induction system 10a.

In normal control operation, hydrogen gas to be supplied to stack 2 is regulated to have a pressure of 50–60 Kpa by pressure control valve 21. When the pressure detected at S18 is below 20 Kpa, there is a probability of leakage of hydrogen gas due to insufficient sealing at some location in hydrogen gas induction system 10a. When the pressure detected at S18 exceeds 90 Kpa, there is a probability of malfunction of pressure control valve 21. Electrolyte membrane 5 may suffer serious damage if hydrogen gas of a pressure exceeding 90 Kpa should be supplied to stack 2.

Comparison of the detected gas pressure with the reference pressure range at S18 is carried out at a predetermined interval (for example, 100 ms) in response to a clock frequency of control unit 151. In practice, "NO" is determined at S18 when the results of three consecutive comparisons give the same extraordinarily low or high hydrogen gas pressure, to exclude any noise in the electric signal from sensor 25. Although not specifically described, the following steps may include some countermeasure to the influence of noise.

The control routine awaits 10 seconds after opening valve 23 at S19 and compares the detected pressure with 10 Kpa at S20. Since hydrogen gas supplied to anode 4 is consumed by reaction with oxygen in the air supplied to cathode 3, the partial pressure of hydrogen in hydrogen gas induction system 10a tends to decrease with time. However, if the pressure is rapidly decreased to below 10 Kpa in 10 seconds, there is a probability of gas leakage due to deterioration of electrolyte membrane 5. If such a pressure drop is determined at S20, apparatus 1 is compulsorily stopped in accordance with the flowchart of FIG. 7 to be described later, and alarm lamp 160 is lit. Any gas leakage from another location is detected at S18.

When no gas leakage through membrane 5 is detected ("NO" at S20), the procedure is advanced to S21 where induction valve 23 is again opened. While keeping induction valve 23 in its open state, discharge valve 33 is controlled such that it is opened for 1 second, followed by closing for 2 seconds, which is repeated over 60 seconds, at S22. During such operation, it is determined if the output voltage from stack 2 satisfies first predetermined output conditions, at S23. When the first predetermined output conditions have been satisfied, the procedure is advanced to the normal operation in accordance with the flowchart of FIG. 6. If not, apparatus 1 is taken out of operation in accordance with the flowchart of FIG. 7 to be described later, and alarm lamp 160 is lit.

The first predetermined output conditions may be, for example, as follows:

(1) output voltage from Stack 2 >first predetermined voltage; and (2) each output voltage from fuel cell group G1–G5 >second predetermined voltage. When both of conditions (1) and (2) are fulfilled, the determination at S23 is "YES" which allows apparatus 1 to run in accordance with the normal operation flowchart of FIG. 6. When either or both of conditions (1) and (2) is not fulfilled, "NO" results at S23 to stop apparatus 1 in accordance with the stop control operation flowchart of FIG. 7.

Figure 6:
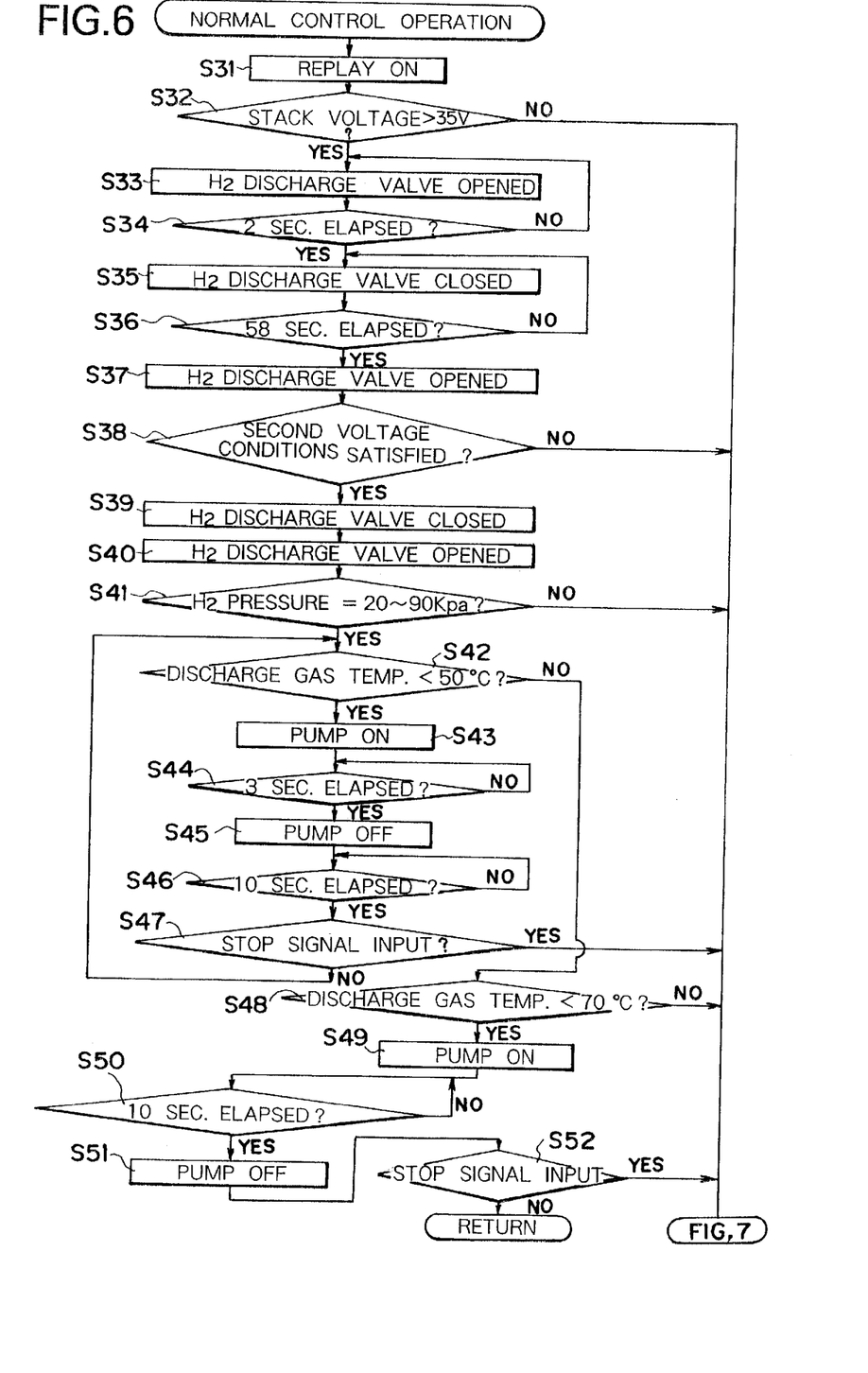
FIG. 6 is a flowchart showing the normal control operation of the apparatus of FIG. 1.

The normal operation is carried out in accordance with the flowchart of FIG. 6 which starts with S31 where relay 71 is turned on to connect the output voltage from stack 2 to motor 77. The output voltage at this time is detected by voltmeter 76 and compared with a reference voltage of 35V, for example, at S32. When the detected output voltage is below 35V ("NO" at S32), which means that a sufficient power to drive motor 77 has not yet been obtained, apparatus 1 is stopped in accordance with the stop operation flowchart of FIG. 7 and alarm lamp 160 is lit. When the detected output voltage is greater than 35V ("YES" at S32), hydrogen gas discharge valve 33 is opened for 2 seconds, and then closed for 58 seconds, at S33–S37, then followed by the determination at S38. Unless S38 produces a "YES" result, operation through S33–S37 is repeated so that fuel gas discharge system 10b is opened for 2 seconds in every 1 minute.

At S38, the output voltage from stack 2 detected when discharge valve 33 is opened at S36 is compared with second predetermined output conditions which, in this embodiment, is represented by the following inequality:

each output voltage from fuel cell group G1–G5>third predetermined voltage

When all of the output voltages from groups G1–G5 exceed the third predetermined voltage, it is determined that the output voltage satisfies the second predetermined output conditions ("YES" at S38) to continue the normal operation of the flowchart of FIG. 6. If at least one of the output voltages from groups G1–G5 does not reach the third predetermined voltage, the result of the determination at S38 is "NO" to stop operation of apparatus 1.

Operation through S39–S41 determines if a sufficient quantity of hydrogen gas has been supplied to hydrogen gas induction system 10a, which is substantially the same as operation through S16–S18 of the flowchart of FIG. 5, the description of which is incorporated here.

At S42, it is determined if the discharge gas temperature is below 50° C. When the discharge gas temperature which should be substantially equal to the stack temperature remains below 50° C., operation through S43–S46 is repeated until there is an input of a stop signal at S47. Through S43–S46, pump 61 is turned on and off to intermittently inject water from nozzles 55 onto the surface of cathode 3 for 3 seconds at every 10 second interval. When the detected discharge gas temperature is equal to or exceeds 50° C. ("NO" at S42), the procedure is advanced to S48 where the detected discharge gas temperature is compared with another higher reference temperature of 70° C., in this embodiment. When the discharge gas temperature exceeds 70° C. ("NO" at S48) which suggests some extraordinary reaction or malfunction in apparatus 1, apparatus 1 is caused to stop and alarm lamp 160 is lit. When the discharge gas temperature is higher than 50° C. but lower than 70° C. ("YES" at S48), pump 61 is driven continuously over 10 seconds, through S49–S51, to cool stack 2 more actively than in the intermittent water supply mode carried out by operation through S43–S46. When the operator turns off the ignition key to generate the stop command signal at S47 or S52, control unit 151 stops apparatus 1.

Figure 7:
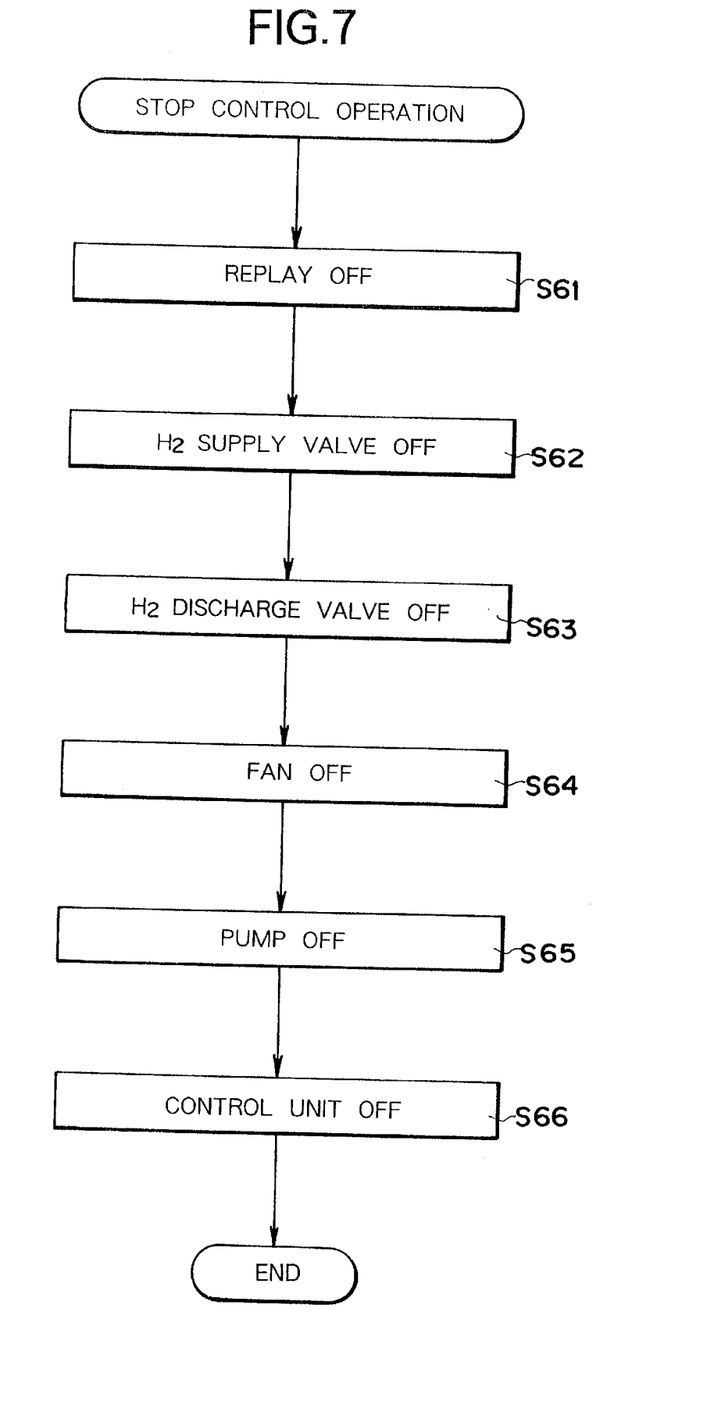
FIG. 7 is a flowchart showing the stop control operation of the apparatus of FIG. 1.

Referring specifically to the flowchart of FIG. 7, the stop control operation begins with S61 where relay 61 is turned off to disconnect stack 2 from motor 77. Then, hydrogen gas supply valve 23 is closed at S62 and hydrogen gas discharge valve 33 is closed at S63. This order of operation will minimize the quantity of hydrogen gas still remaining in apparatus 1 after it is stopped, which would be used in the post reaction. Fan 64 is turned off at S64 after supply of hydrogen gas is interrupted, which facilitates the cooling of electrolyte membrane 5. Then, pump 61 is turned off to interrupt water supply to stack 2 at S65. Finally, a power switch to control unit 151 is turned off at S66.

Although the present invention has been described in conjunction with specific embodiments thereof, it is to be understood that it is capable of considerable variation and modification without departure from the scope of the appended claims. For example, the water spray nozzle is preferably mounted in the air intake manifold at the cathode but may be provided at any location and at any distance from the cathode, so long as it can supply liquid water to the cathode. When the fuel cell system is installed at factory or home, it may be connected to municipal waterworks so that city water is supplied to the cathode.

What is claimed is:

1. A fuel cell system comprising:

one or more of fuel cells each having an anode, a cathode and an electrolyte membrane interposed between said anode and said cathode;

first gas supplying means for supplying a first gas including fuel gas to said anode;

second gas supplying means for supplying a second gas including oxygen to said cathode;

liquid water supplying means for supplying liquid water to the surface of said cathode;

sensor means for detecting a temperature of a discharge gas discharged from said fuel cells; and control means responsive to detection by said sensor means to control operation of said liquid water supplying means' such that said liquid water is intermittently supplied to the surface of said cathode, with supply periods of a first duration, when said sensor means detects that said discharge gas has a temperature below a first predetermined temperature while said system is in operation and said liquid water is continuously supplied, over a supply period of a second duration longer than said first duration, when said sensor means detects that said discharge gas is at a temperature equal to or higher than said first predetermined temperature.

2. A fuel cell system according to claim 1 wherein said liquid water supplying means operates to supply continuously said liquid water to the surface of said cathode when said sensor means detects that said discharge gas from said fuel cells has a temperature above said first predetermined temperature but still below a second predetermined temperature.

3. A fuel cell system according to claim 2 wherein said control means interrupts operation of said system when said sensor means detects that said discharge gas from said fuel cells has a temperature above said second predetermined temperature.

4. A fuel cell system according to claim 1 wherein said liquid water supplying means is a pump.

* * * * *